United States Patent [19]

Friederichs et al.

[11] Patent Number: 5,123,788
[45] Date of Patent: Jun. 23, 1992

[54] CUTTING INSERT WITH RAISED CUTTING EDGE

[75] Inventors: John W. Friederichs, West Branch; Yefim Val, Troy, both of Mich.

[73] Assignee: GTE Valenite Corporation, Troy, Mich.

[21] Appl. No.: 709,213

[22] Filed: May 20, 1991

Related U.S. Application Data

[63] Continuation of Ser. No. 88,316, Aug. 24, 1987, abandoned.

[51] Int. Cl.5 .................. B23B 27/16; B23B 27/22
[52] U.S. Cl. ................................. 407/114; 407/116
[58] Field of Search ......................... 407/113–116

[56] References Cited

U.S. PATENT DOCUMENTS

| | | | |
|---|---|---|---|
| 4,087,193 | 5/1978 | Mundy | 407/114 |
| 4,124,326 | 11/1978 | Cost | 407/114 |
| 4,367,990 | 1/1983 | Porat et al. | 407/114 |
| 4,507,024 | 3/1985 | Stashko | 407/114 |
| 4,675,844 | 8/1987 | McCreery et al. | 407/115 X |

*Primary Examiner*—Steven C. Bishop
*Attorney, Agent, or Firm*—Bill C. Panagos

[57] ABSTRACT

A cutting insert having a particular configuration for cutting tough metals such as encountered in the turning of railway wheels is provided with a specific chip breaker configuration which tends to strengthen the negative rake cutting land.

1 Claim, 1 Drawing Sheet

CUTTING INSERT WITH RAISED CUTTING EDGE

This is a continuation of copending application Ser. No. 07/088,316 filed on Aug. 24, 1987, now abandoned.

FIELD OF INVENTION

The present invention is directed to cutting inserts of the type for high metal removal of relatively tough metals such as encountered in the turning of railway wheels.

BACKGROUND OF INVENTION

U.S. Pat. No. 4,124,326 to Cost relates to a cutting insert of the aforementioned type which is particularly suited for cutting tough metals. The insert described has a raised negative rake cutting land forming an obtuse cutting edge angle with side walls extending normal to the cutting face.

SUMMARY OF INVENTION

Altjough the above patent to Cost represented an improvement for achieving a stronger corner against impact and cutting pressure breakage while achieving good cutting speeds on the order of 120 to 300 feet per minute, improvement in the ability of the edge to withstand impact which results in edge chippage is desirable.

An object of the present invention is to decrease the tendency of the cutting edge to chip during the initial contact or impact of the insert with the workpiece.

An object of the present invention is to provide for efficient chip breakage and removal at different feed rates.

A further object of the present invention is to improve the geometric configuration of the chip breaker channel so that the tendency of flowing chips to cause damage to the insert is reduced.

A further object of the present invention is to obviate one or more disadvantages inherent in cutting inserts of the aforementioned type as known in the prior art.

Other objects and features of the present invention may become apparent to one of ordinary skill in the art from a reading of the following detailed description.

In accordance with the present invention, there is provided a hard, wear resistant cutting insert having a raised peripheral negative rake cutting land extending entirely around the insert. The insert includes a raised flat central island with a chip breaker channel intermediate the cuuting land and the central island. A pair of side and a pair of end walls are joined by arcuate corners and join the cutting land to form a continuous cutting edge. According to the improvement of the present invention, the chip breaker channel comprises a descending surface adjacent the cutting land and an ascending surface adjacent the central island. An adjoining flat land is intermediate the descending and ascending surfaces. The flat land is substantially parallel to the flat central island and perpendicular to the walls. The descending surface comprises a plurality of surfaces with at least two of the surfaces being at different descending angles with respect to the flat land for enchancing the strength of said cutting edge.

DETAILED DESCRIPTION OF THE INVENTION

Figure 1:
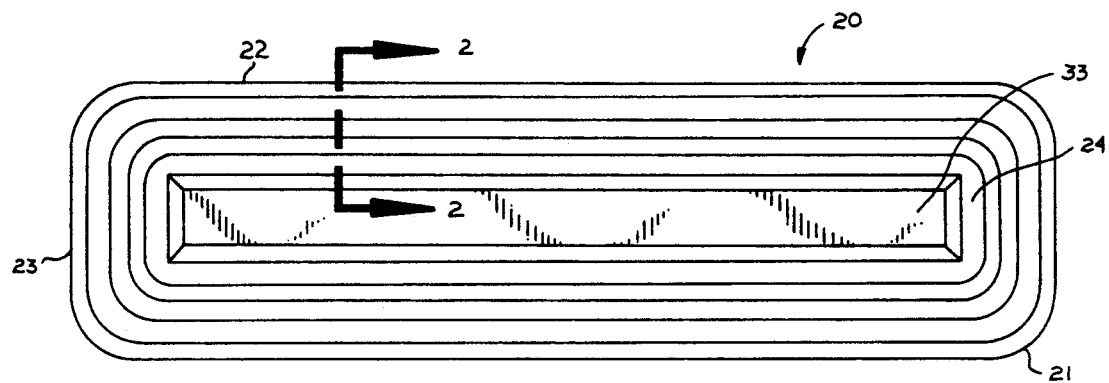
FIG. 1 is a top plan view of the cutting insert.

The description of U.S. Pat. No. 4,124,326 to John C. Cost is incorporated by reference into the specification of this application by reference.

The cutting insert 20 includes a peripheral negative rake cutting edge land 21 terminating at and forming an obtuse angle with the side walls 22 and end walls 23. The walls 22 and 23 which are joined by arcuate corners extend normal to a flat interior land 24 of the insert. A gradual descending surface 25 extends from the top inner margin of the cutting edge land 21 to the flat interior land 24. The raised cutting edge land 21 forms an obtuse angle with the side and end walls. The angle of the negative rake cutting land with respect to a plane normal to the walls is within the range of 5 to 30 degrees and is preferably about 10 degrees.

The insert may have a transverse aperture chamfered for the head of a clamping screw as set forth in the above patent. Optimally, particularly with wide inserts, a central aperture normal to the cutting face may be employed to clamp the bottom of the insert directly to a corner pocket wall of a suitable holder.

Figure 2:
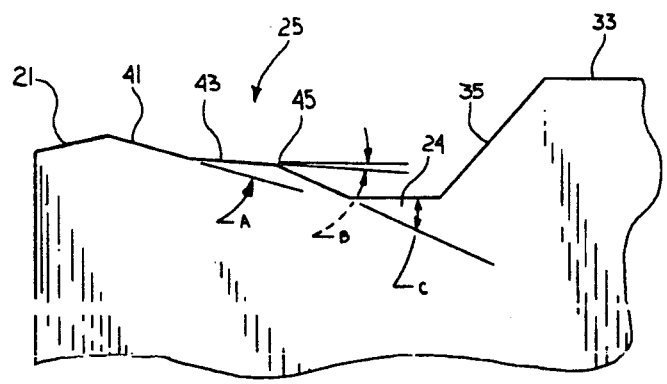
FIG. 2 is a partial section view taken along line 2—2 of FIG. 1.

As shown in FIG. 2, the central island 33 extends above the flat interior land 24. Both the central island 33 and the flat interior land 24 are flat surfaces substantially normal to the walls. The chip breaker channel comprises the decending surface 25 which joins the cutting land 21 and the flat land 24, the flat land 24, and the ascending land 35 which joins the flat interior land 24 and the central island 33. The lands forming the chip breaker channel are each preferably of uniform width and extend entirely around the periphery of the central island 33.

In accordance with the principles of present invention, the descending surface 25 comprises a plurality of surfaces 41, 43, 45 with at least two of the surfaces being at different descending angles with respect to said flat land for enhancing the strength of said cutting edge. As illustrated in detail in FIG. 2, two of the surfaces 41 and 45 are at a relatively steep descending angle while surface 43 is at a relatively gradual descending angle. The descending angle A, B, and C as shown in FIG. 2 are measured with respect to a plane normal to the walls or parallel to the flat island surface 33. The steep slope of angle A and B is preferably from about 10 to about 30 degrees. The shallow slope of angle B is preferable from about 2 to about 10 degrees. More preferably, angle A is from about 12 to about 17 degrees and angle B is from about 25 to 32 degrees. Preferably, angle A is less steep than angle B, so that a secondary chip breaker channel is formed for light feed rates.

Each of the respective surfaces 41, 43, and 45 have a uniform width and extend about the central island 33. The width of the lands depend on the size of the insert; the speed and depth of the cut. In general, the width of each of the respective surfaces 41, 43, and 45 approximates the width of the cutting land 21.

In operation, a chip being cut by the negative rake cutting land 21 initially flows downwardly at an angle corresponding with the angle of land 41. The land 41 begins to exert a tensile force on the chip which tends to cause the chip to tear or break. The steep angle also tends to cause a build-up in tensile forces at the edge. Next, the flowing chip encounters a shallow descending surface which tends to distribute the tensile forces of the following chip over a wide portion of the insert thereby decreasing the tendency for the edge to break away from the base of the insert. The shallow descending surface maintains tension on the chip and directs the chip away from the cut. Next, the chip flows down a steep descending surface 45 and encounters the flat surface 24 and ascending backwall surface 35, these latter surfaces change the direction of the chip and cause it to break. As illustrated in FIG. 1, the distance between the side walls and the island corners are located symmetrically.

The configuration of the chip breaker channel is believed to be advantageous for variable feed rates. At low-feed rates, the surface 43 forms a secondary chip breaker and directs the chip. At high-feed rates the lower portion of the chip breaker channel, surfaces 45 and 24 form this primary chip breaker to direct the chip.

We claim:

1. An improved hard wear resistent insert of the type having a raised peripheral negative rake cutting land extending entirely around the insert and a raised flat central island with a chip breaker channel intermediate the cutting land and the central island, said flat central island projecting above said negative rake cutting land, a pair of side walls and a pair of end walls joined by arcuate corners and joining said cutting land to form a continuous cutting edge, the improvement comprising a chip breaker channel having a descending surface adjacent said cutting land, an ascending land adjacent said central island and a flat land intermediate and adjoining said descending surface and said ascending land, said flat land being substantially parallel to said flat central island and perpendicular to said walls, said ascending land and said flat land extending entirely around said raised flat central island, said descending surface further comprising a first surface joining said cutting land, a second surface joining said first surface, and a third surface joining said second surface and said flat land, said first, second and third surfaces extending entirely around said raised central island and forming said entire descending surface, said first surface descending downwardly at an angle of from about 12 to 18 degrees, said second surface descending downwardly at an angle of from 5 to about 9 degrees, and said third surface descending downwardly at an angle from about 25 to about 35 degrees, said descending angles being determined with respect to said raised flat central island.

* * * * *